United States Patent Office 2,904,606
Patented Sept. 15, 1959

2,904,606

SEPARATION OF ORTHO- AND PARA-METHYLSTYRENE

Forrest Vaughan Williams, Dayton, Ohio, assignor to Monsanto Chemical Company, St. Louis, Mo., a corporation of Delaware No Drawing. Application July 25, 1957
Serial No. 674,011

8 Claims. (Cl. 260—669)

This invention relates to a method for separating or resolving mixtures of ortho- and para-methylstyrene. It has long been desired to obtain pure ortho-methylstyrene for the production of high-heat distortion polymers, either as homopolymers or as copolymers with acrylonitrile. However, it has been impractical to separate ortho-methylstyrene from the concomitantly produced para-methylstyrene by distillation means, since these two isomers differ by only 3° C. in boiling point.

It has now been found that mixtures of ortho-methylstyrene and para-methylstyrene may readily be separated by treating mixtures thereof with complexes of 4-alkyl pyridines together with anion salts of manganese, iron, cobalt, and nickel. It has been found that the said complexes form clathrates selectively with the para-methylstyrene, leaving the ortho-methylstyrene in a pure form.

The present type of complex formation known as clathration is considered to involve the entrance of certain specific molecules of an organic material into an inorganic crystalline lattice. The mechanism by which this occurs is apparently the formation of voids or open spaces which exist in the crystal lattice of the inorganic parent compound. It has been found that the dimensions of the entering molecules are highly critical in this relationship, and that the entering molecules must be smaller than a higher limit, and larger than a smaller critical limit, in order for this effect to take place. The dimensions of the voids or open spaces are fixed for a particular complex of the 4-alkly pyridines together with the monovalent anion salts of the divalent metals selected from the group consisting of manganese, iron, cobalt, and nickel. Because the dimensions of the voids are thus fixed, a selectivity is provided for the size and lengths of the molecules which can be captured and held by a particular host crystalline complex. In the present clathrates, the differences of geometric configuration of ortho- and para-methylstyrene allow the metal-pyridine complexes selectively to form clathrate compounds with the para-isomer having dimensions corresponding to the voids in the metal complexes, while the ortho-isomer remains in a free state.

The 4-alkyl pyridine employed herein may be, for example, 4-methyl pyridine or 4-ethyl pyridine. It has been found that the higher 4-alkyl pyridines, such as 4-propyl pyridine is ineffective in clathrating para-methylstyrene. It has also been found that 3-substituted pyridines are ineffective in this relationship.

The metal salts which are employed in the present invention in the formation of a complex for clathration are preferably the monovalent anion salts of the divalent metals selected from the group consisting of manganese, iron, cobalt, and nickel, such as manganous thiocyanate, manganous chloride, manganous acetate, ferrous thiocyanate, ferrous cyanide, ferrous nitrite, cobaltous thiocyanate, cobaltous cyanide, cobaltous nitrite, nickelous thiocyanate, nickelous cyanate, and nickelous isocyanate. The proportion of the metal salt which is employed with the 4-alkyl pyridine in order to form the complex is in the general range of from 0.01 to 0.25 moles of the metal salt relative to the pyridine compound. This range corresponds to an excess of pyridine compound which is preferably maintained to obtain the maximum yield of complex.

It has been found that the proportion of the para-methylstyrene which is clathrated in the above-described complex varies in the range of from 3% to 40% by weight of the said para-methylstyrene relative to the weight of the said complex. The free ortho-methylstyrene may be removed by decantation or filtration from the clathrated complex, after which the complex is readily decomposed by heating or acid decomposition in order to recover the para-methylstyrene and the complex for recycling.

Various solvents may also be employed in the practice of the present invention, either as the solvent for the mixed methylstyrenes or for the complex, particularly hydrocarbon solvents such as naphtha, kerosene, gasoline, and other organic solvents such as the lower aliphatic, monohydroxy compounds containing at least three carbon atoms, especially glycol mono-ethers. Specific glycol mono-ethers include, for example, the methyl, ethyl, isopropyl, n-propyl, isobutyl, n-butyl, tert-butyl, isoamyl, amyl, and hexyl mono-ethers of ethylene, glycol, diethylene glycol, triethylene glycol, 1,2-propylene glycol, 1,3-propylene glycol, polypropylene glycols, 1,2-butylene glycol, 1,3-butylene glycol, 2,3-butylene glycol, 1,4-butylene glycol, etc. The lower alkyl diethers of glycerol and other polyhydroxy compounds may also be employed. In addition, the aliphatic mono-alcohols containing more than three carbon atoms may also be employed, including n-butyl alcohol, isobutyl alcohol, sec.-butyl alcohol, tert-butyl alcohol, isoamyl alcohol, n-amyl alcohol, hexyl alcohols, heptyl alcohols, octyl alcohols, nonyl alcohols, decyl alcohols, etc. A preferred group of solvents are those aliphatic or cycloaliphatic compounds which contain one hydroxyl group and at least one other ether linkage. The various Cellosolve derivatives of ethylene glycol or propylene glycol are particularly suitable, from methyl to butyl Cellosolve. Other materials such as water, ethanol, or hydrocarbons may also be added in some cases to modify the solvent properties of the primary solvent.

Another valuable group of solvents are the lower aliphatic dihydroxy or trihydroxy compounds, especially glycols. Such solvents include, for example, ethylene glycol, 1,2-propylene glycol, 1,3-propylene glycol, diethylene glycol, triethylene glycol, dipropylene glycol, glycerol, glycerol monoethers, 1,3-butanediol, 2,3-butanediol, 1,4-butanediol, 2-butene-1,4-diol, and mixtures of these and similar materials. Other materials such as water, ethanol, or hydrocarbons may also be added in some cases to modify the solvent properties of the polyhydroxy compounds.

The following examples illustrate specific embodiments of the present invention:

*Example 1*

A series of experiments was performed utilizing various alkyl pyridines in order to demonstrate their efficiency in the present clathration. Complexes I, II, and III were formed by mixing one mole of nickel thiocyanate and four moles of the alkyl pyridine. The clathration was then conducted by continuous addition of the complex to a mixture of two moles of crude methylstyrene composed of 72% of the para-isomer and 28% of the ortho-isomer. The alkyl pyridines employed in the present series consisted of 4-methyl pyridine, 3-methyl pyridine, and 4-n-propyl pyridine. The complexes also included an iron complex prepared by the addition of ferrous thiocyanate with 4-methyl pyridine. The results obtained are summarized in the table below, showing the efficiency of clathration, i.e., the proportion of methyl styrenes clathrated relative to the amount charged.

| Complex | Alkyl Pyridine | Efficiency, percent |
|---|---|---|
| I | 4-methyl pyridine | 77 |
| II | 3-methyl pyridine | 0 |
| III | 4-n-propyl pyridine | 0 |
| IV | 4-methyl pyridine Fe [4-methyl pyridine]$_4$(SCN)$_2$ | 88 |

The above results demonstrate that 4-substituted pyridines are necessary for clathration, and that superior results are obtained with the 4-methyl pyridine.

*Example 2*

Further tests were conducted similarly to Example 1 but with various metal tetra[4-methylpyridine]dithiocyanates with mixed methylstyrenes in order to show the selectivity and capacities of the respective metals. The mixed methylstyrenes charged were composed of 72% para and 28% ortho compounds.

| Moles Methylstyrene/Mole Metal Complex | | | Composition of Clathrated Material |
|---|---|---|---|
| Metal | Charge | Clathrate | |
| Ni$^{++}$ | 4 | 0.6 | 90% p-, 10% o- |
| Fe$^{++}$ | 4 | 0.94 | 82.3% p-, 17.7% o- |
| Co$^{++}$ | 4 | 0.86 | 82.5% p-, 17.5% o- |

*Example 3*

The present example is intended to show the variation of composition and yield with the relative proportions of the methylstyrenes to the complex. A series of experiments was conducted similarly to Example 1 but with varying proportions of the complex relative to the hydrocarbon charge, which was 72% para-methylstyrene and 28% ortho-methylstyrene. The results obtained are summarized below.

| Moles Methylstyrene/Mole Ni Complex | | Composition of Clathrated Material |
|---|---|---|
| Charge | Clathrate Obtained | |
| 4 | 0.60 | 90% p-, 10% o- |
| 8 | 0.70 | 87% p-, 13% o- |

This example shows that excellent results in clathration are obtained with the hydrocarbon charge of crude methylstyrenes being present in the proportion of from 80 to 160% by weight of the complex.

What is claimed is:

1. A method for separating para-methylstyrene from a mixture of para-methyl- and ortho-methylstyrene which comprises contacting the said mixture with a complex of a 4-alkyl pyridine in which the alkyl radical has from 1 to 2 carbon atoms and an anion salt of a metal of the group consisting of manganese, iron, cobalt and nickel.

2. A method for separating para-methylstyrene from a mixture of para-methyl- and ortho-methylstyrene which comprises contacting the said mixture with a complex of 4-methyl pyridine and nickel thiocyanate.

3. A method for separating para-methylstyrene from a mixture of para-methyl- and ortho-methylstyrene which comprises contacting the said mixture with a complex of 4-ethyl pyridine and nickel thiocyanate.

4. A method for separating para-methylstyrene from a mixture of para-methyl- and ortho-methylstyrene which comprises contacting the said mixture with a complex of 4-methyl pyridine and ferrous thiocyanate.

5. A method for separating para-methylstyrene from a mixture of para-methyl- and ortho-methylstyrene which comprises contacting the said mixture with a complex of a 4-alkyl pyridine in which the alkyl radical has from 1 to 2 carbon atoms and an anion salt of a metal of the group consisting of manganese, iron, cobalt and nickel, in which the proportion of the said methylstyrene mixture is from 3% to 40% by weight of the said complex.

6. A method for separating para-methylstyrene from a mixture of para-methyl- and ortho-methylstyrene which comprises contacting the said mixture with a complex of 4-methyl pyridine and nickel thiocyanate, in which the proportion of the said methylstyrene mixture is from 80 to 160% by weight of the said complex.

7. A method for separating para-methylstyrene from a mixture of para-methyl- and ortho-methylstyrene which comprises contacting the said mixture with a complex of 4-ethyl pyridine and nickel thiocyanate, in which the proportion of the said methylstyrene mixture is from 80 to 160% by weight of the said complex.

8. A method for separating para-methylstyrene from a mixture of para-methyl- and ortho-methylstyrene which comprises contacting the said mixture with a complex of 4-methyl pyridine and ferrous thiocyanate, in which the proportion of the said methylstyrene mixture is from 80 to 160% by weight of the said complex.

References Cited in the file of this patent

UNITED STATES PATENTS

| | | |
|---|---|---|
| 2,798,103 | Schaeffer et al. | July 2, 1957 |
| 2,798,891 | Schaeffer | July 9, 1957 |